(12) United States Patent
Sarayeddine et al.

(10) Patent No.: US 9,575,317 B2
(45) Date of Patent: Feb. 21, 2017

(54) OPTICAL GUIDE SUITABLE FOR CREATING TWO LUMINOUS IMPRINTS

(71) Applicant: OPTINVENT, Rennes (FR)

(72) Inventors: Khaled Sarayeddine, Rennes (FR); Xavier Hugel, Rennes (FR); Pascal Benoit, Rennes (FR)

(73) Assignee: OPTINVENT, Rennes (FR)

(*) Notice: Subject to any disclaimer, the term of this patent is extended or adjusted under 35 U.S.C. 154(b) by 0 days.

(21) Appl. No.: 15/032,748

(22) PCT Filed: Oct. 28, 2014

(86) PCT No.: PCT/EP2014/073136
§ 371 (c)(1),
(2) Date: Jul. 6, 2016

(87) PCT Pub. No.: WO2015/063097
PCT Pub. Date: May 7, 2015

(65) Prior Publication Data
US 2016/0306170 A1 Oct. 20, 2016

(30) Foreign Application Priority Data
Oct. 29, 2013 (FR) ..................................... 13 60532

(51) Int. Cl.
*G02B 6/00* (2006.01)
*G02B 27/01* (2006.01)
(Continued)

(52) U.S. Cl.
CPC ......... *G02B 27/0172* (2013.01); *G02B 5/3083* (2013.01); *G02B 6/0036* (2013.01);
(Continued)

(58) Field of Classification Search
CPC . G02B 27/0172; G02B 5/3083; G02B 6/0036; G02B 6/0056; G02B 27/0176; G02B 27/283; G02B 2027/0125
(Continued)

(56) References Cited

U.S. PATENT DOCUMENTS 5,712,694 A * 1/1998 Taira .................... G02B 6/0023
349/175
5,777,975 A * 7/1998 Horinouchi .......... G02B 27/283
369/103
(Continued)

FOREIGN PATENT DOCUMENTS

WO    WO 2012/136470    10/2012

OTHER PUBLICATIONS

International Search Report for PCT/EP2014/073136 dated Jan. 27, 2015, three pages.
(Continued)

*Primary Examiner* — Ellen Kim
(74) *Attorney, Agent, or Firm* — Nixon & Vanderhye, P.C.

(57) ABSTRACT

An optical guide comprises at least one guiding element adapted for enabling, by total internal reflections, transporting an image taking the form of a collimated light beam from an injection zone to an extraction zone where an extracting device for extracting the image is mounted. The optical guide comprises a retardation plate and a polarization beam splitter, the polarization beam splitter being placed between the guiding element and the extracting device. The optical guide is such that each ray of said collimated light beam striking the polarization beam splitter for the first time separates into two portions, a first portion being transmitted to the extracting device so as to define a first light imprint and a second portion being reflected by the polarization
(Continued)

beam splitter, said second portion continuing to be guided by the guiding element and thus passing twice through the retardation plate before striking the polarization beam splitter so as to define a second light imprint.

5 Claims, 4 Drawing Sheets

(51) Int. Cl.
    *G02B 27/28* (2006.01)
    *G02B 5/30* (2006.01)
    *F21V 8/00* (2006.01)
(52) U.S. Cl.
    CPC ....... *G02B 6/0056* (2013.01); *G02B 27/0176* (2013.01); *G02B 27/283* (2013.01); *G02B 2027/0125* (2013.01)
(58) Field of Classification Search
    USPC ........ 385/11, 146, 43, 129–131; 349/61, 62, 349/65, 67
    See application file for complete search history.

(56) References Cited

U.S. PATENT DOCUMENTS

| | | | |
|---|---|---|---|
| 5,966,223 A * | 10/1999 | Friesem | G02B 5/188 359/16 |
| 6,002,829 A * | 12/1999 | Winston | F21V 5/02 385/129 |
| 7,006,173 B1 * | 2/2006 | Hiyama | G02F 1/133536 349/61 |
| 7,784,954 B1 | 8/2010 | Coleman | |
| 9,435,955 B2 * | 9/2016 | Dubroca | G02B 6/262 |
| 2003/0165017 A1 * | 9/2003 | Amitai | G02B 6/0018 359/636 |
| 2007/0064310 A1 | 3/2007 | Mukawa et al. | |
| 2010/0002991 A1 | 1/2010 | Dejong | |
| 2012/0176682 A1 | 7/2012 | Dejong | |
| 2012/0200831 A1 | 8/2012 | Tominaga | |
| 2013/0276960 A1 | 10/2013 | Amitai | |

OTHER PUBLICATIONS

Written Opinion of the Isa for PCT/EP2014/073136 dated Jan. 27, 2015, five pages.

* cited by examiner

OPTICAL GUIDE SUITABLE FOR CREATING TWO LUMINOUS IMPRINTS

This application is the U.S. national phase of International Application No. PCT/EP2014/073136 filed 28 Oct. 2014 which designated the U.S. and claims priority to FR Patent Application No. 1360532 filed 29 Oct. 2013, the entire contents of each of which are hereby incorporated by reference.

The present invention relates to an optical guide having an injection zone for injecting a light signal into the optical guide and an extraction zone for supplying the light signal after transmission through the optical guide.

Typically, an optical guide has a guide region in which the light signal is transported by internal reflections from an injection zone to an extraction zone. The most common case is that of a guide in the form of a plate in which the light signal is reflected successively by total internal reflections. The distance between the external faces of the optical guide on which the light signal is reflected within the optical guide from the injection zone to the extraction zone is called the thickness of the optical guide.

The image, or the light signal, to be transported is injected into the optical guide thanks to an injecting device. The image consists of a light beam issuing from a source which may be of the LCoS ("Liquid Crystal on Silicon"), LCD ("Liquid Crystal Display") or OLED ("Organic Light-Emitting Diode) type. An optical system based on lenses, and optionally mirrors, projects this image in the form of a collimated beam, which is then introduced into the optical guide through the injection zone.

Figure 1:
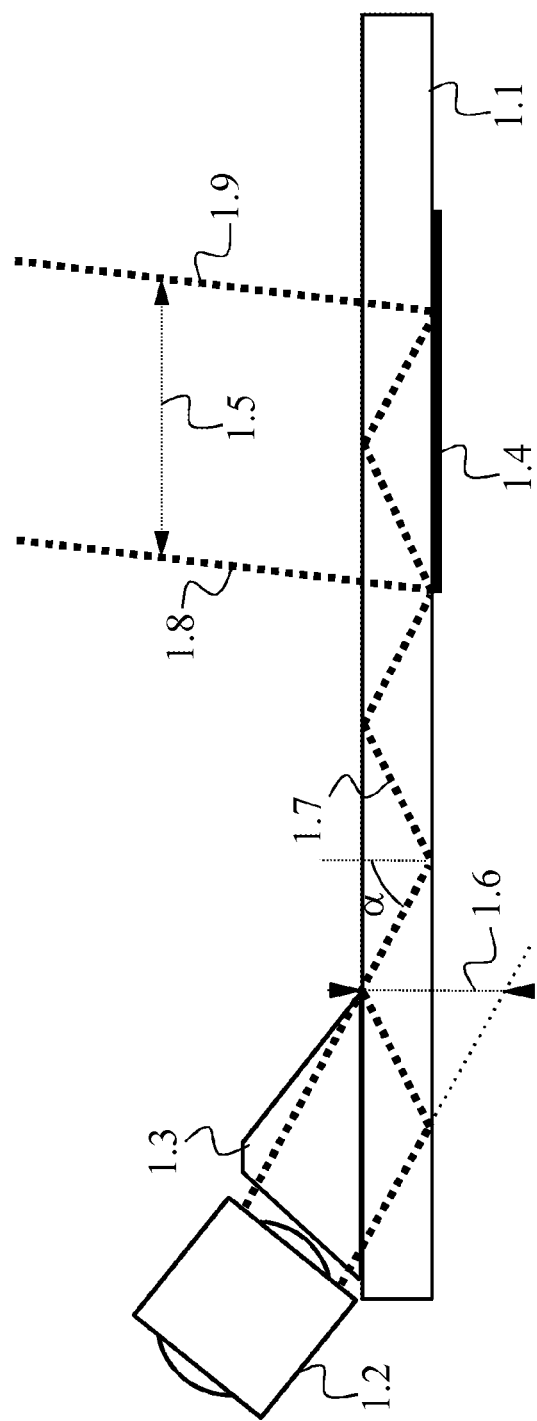

An embodiment known from the prior art is schematically illustrated in FIG. 1. The optical guide comprises an optical guiding element 1.1, a light source (not shown) adapted for providing an image, an optical system 1.2 based on lenses for projecting this image in the form of a collimated light beam, and an injection prism 1.3 for injecting said light beam into the optical guiding element 1.1 via an injection zone. The optical guide further comprises an extracting device 1.4 for supplying the image transported by the light beam, for example to the eye of a user.

For a given optical specification, i.e. fixed field and eye box 1.5, there results a certain thickness of the guiding element 1.1, and thus a certain pupil size 1.6 of the optical guide. In other words, the size of the injection zone, and therefore of said optical system based on lenses, is thus dependent on the thickness of the guiding element used, which itself is dependent on the size of the extraction zone and the desired resolution, and therefore the size of the injecting device is also. Reducing the thickness of the guiding element 1.1 would make it possible to reduce the dimensions of said optical system based on lenses, but to the detriment of the size of the eye box 1.5, delimited by the rays 1.8 and 1.9 in FIG. 1.

It is desirable to provide a solution which makes it possible, for a given eye box size, to reduce the size of the injecting device, that is to say to reduce the size of the injection zone.

It is particularly desirable to provide a solution that enables the luminance perceived in the light signal supplied via the extraction zone to be uniform.

It is particularly desirable to provide a solution that is simple to implement at low cost.

The invention relates to an optical guide comprising at least one guiding element adapted for enabling, by total internal reflections, transporting an image in the form of a collimated light beam from an injection zone to an extraction zone where an image-extracting device is mounted. The optical guide comprises a retardation plate and a polarisation beam splitter, the polarisation beam splitter being placed between the guiding element and the extracting device. The optical guide is such that each ray of said collimated light beam striking the polarisation beam splitter for the first time separates into two portions, a first portion being transmitted to the extracting device to define a first light imprint and a second portion being reflected by the polarisation beam splitter, said second portion continuing to be guided by the guiding element and, in so doing, passing twice through the retardation plate before hitting the polarisation beam splitter in order to define a second light imprint. Thus, for a given eye box size, thanks to the use of the two light imprints, the size of the injection zone is reduced. Accordingly, the size of an injecting device for injecting the collimated light beam is also reduced.

According to a particular embodiment, the optical guide comprises a single guiding element, and the retardation plate and the polarisation beam splitter are sandwiched between an outer face of said guiding element and the extracting device, the polarisation beam splitter being disposed between the retardation plate and the extracting device. Thus the parameterising of the various components of the optical guide (orientation of the fast axis of the retardation plate, direction of the polarisation transmitted by the polarisation beam splitter and phase shift caused by the retardation plate) for uniform energy distribution between the two light imprints is simple.

According to a particular embodiment, the optical guide comprises two guiding elements, the retardation plate is sandwiched between the two guiding elements, and the polarisation beam splitter is sandwiched between an outer face of the assembly formed by said guiding elements and the extracting device. Thus manufacture of the optical guide is simplified by avoiding performing two laminations one on the other. In addition, the optical guide has better resistance under impact by a projectile.

According to a particular embodiment, the optical guide comprises a single guiding element, the retardation plate is provided on an outer face of said guiding element, and the polarisation beam splitter is sandwiched between the other outer face of said guiding element and the extracting device. Thus manufacture of the optical guide is simplified by avoiding performing two laminations one on the other.

According to a particular embodiment, the extracting device is formed by a plate, the external face of which has a set of reflective microstructures formed on surface, said microstructures being formed by prisms having an angle enabling the collimated light beam to emerge from the optical guide. Thus manufacturing the extracting device is simple.

According to a particular embodiment, the extracting device consists of a first portion having a set of semi-reflective microstructures formed on surface, said microstructures consisting of prisms having an angle enabling the collimated light beam to emerge from the optical guide, and a second portion comprising on the surface microstructures with a shape complementary to those of the first portion, an adhesive layer joining the first and second portions so that any microstructure of the first portion is separated from its complementary microstructure of the second portion by a transparent medium of substantially constant thickness. Thus manufacturing the extracting device is simple and vision through the optical guide is improved.

According to a particular embodiment, the optical guide has mechanical reinforcement by compensating a difference between the thickness of the optical guide in an zone where the collimated light beam is propagated by total internal reflections and the thickness of the optical guide at the extraction zone, so that said mechanical reinforcement does not change said total internal reflections. Thus the mechanical strength of the optical guide is improved in a simple manner.

According to a particular embodiment, the polarisation beam splitter is implemented by interferential treatment in the form of vacuum deposition of a plurality of layers of different materials with different indices, so that the transmissivity for the p-polarisation is total, the reflectivity for p-polarisation is null, the transmissivity for the s-polarisation is partial and the reflectivity for the s-polarisation is also partial, or vice versa. Thus a better see-through effect is obtained.

Figure 2:
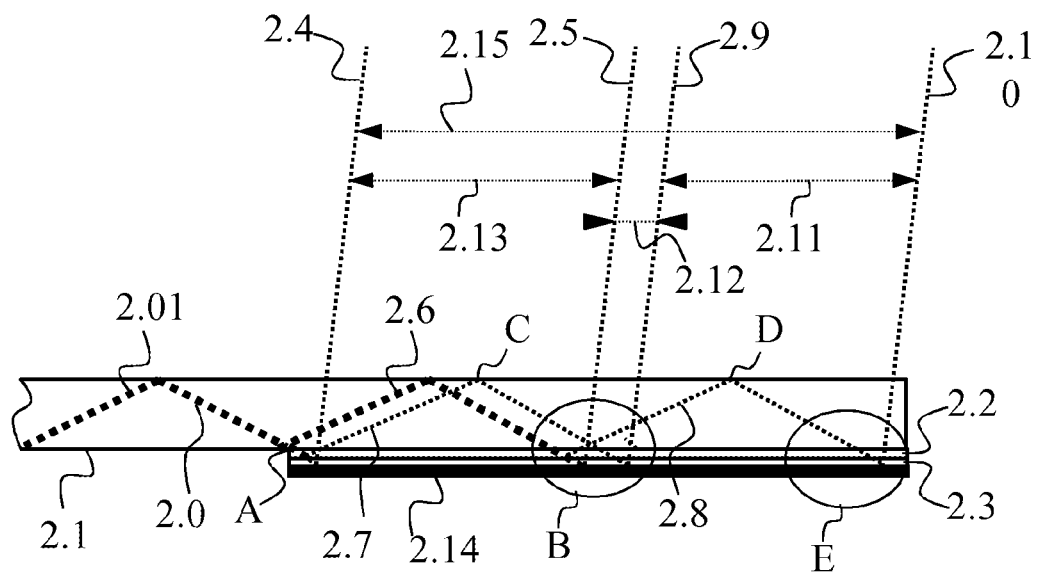
Figure 3:
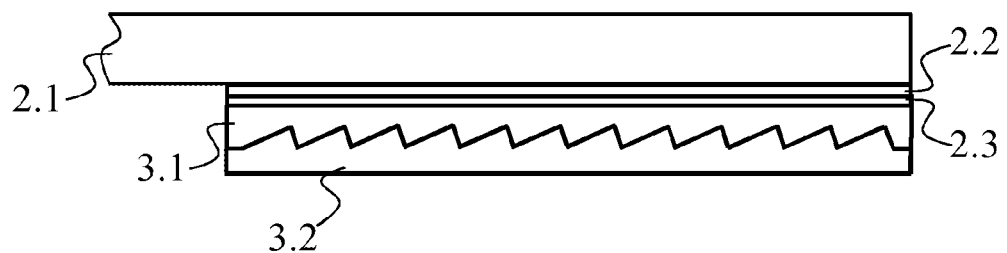
Figure 4:
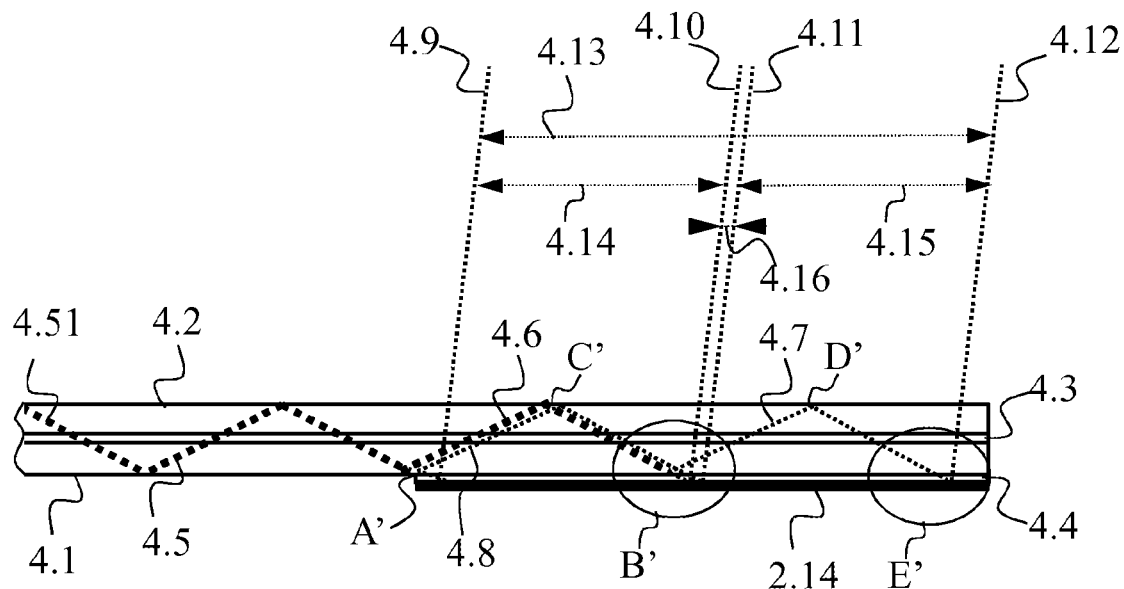
Figure 5:
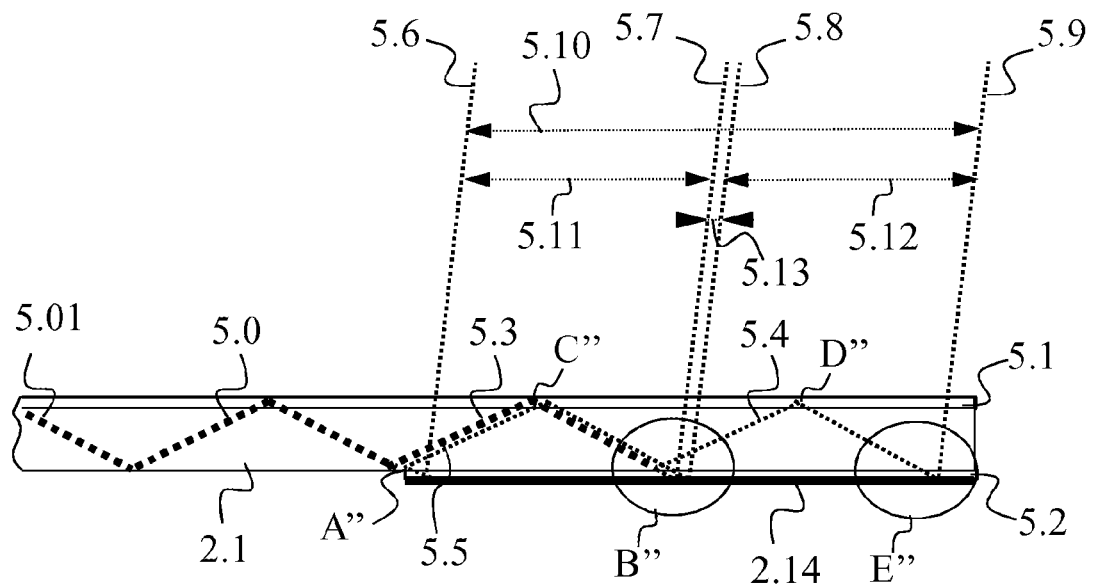
Figure 6:
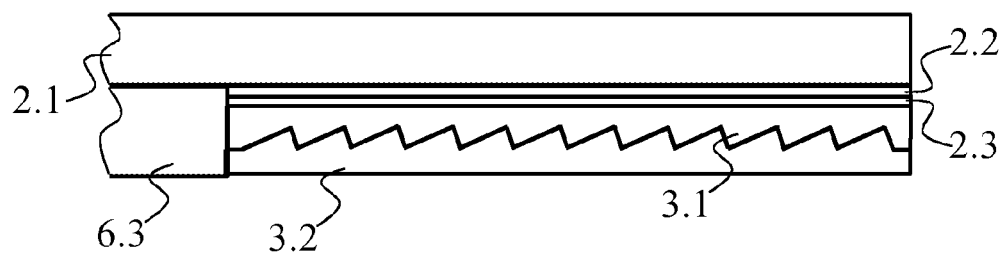

The characteristics of the invention mentioned above, as well as others, will emerge more clearly on reading the following description of an example embodiment, said description being given in conjunction with the accompanying drawings, in which:

FIG. 1 schematically illustrates a first optical guide, known from the prior art;

FIG. 2 schematically illustrates a portion of a second optical guide, according to one embodiment of the present invention;

FIG. 3 schematically illustrates an arrangement of an optical guide extracting device, which may be implemented in the context of the present invention;

FIG. 4 schematically illustrates a portion of a third optical guide according to an embodiment of the present invention;

FIG. 5 schematically illustrates a portion of a fourth optical guide, according to one embodiment of the present invention; and FIG. 6 schematically illustrates an arrangement of mechanical reinforcement of the optical guide, which can be implemented in the context of the present invention.

The invention relates to an optical guide comprising at least one optical guiding element adapted for enabling, by total internal reflections, transporting an image in the form of a collimated light beam from an injection zone to an extraction zone where an image extracting device is mounted. To reduce the dimensions of the injection zone and consequently the size of an injecting device for injecting the collimated light beam in the optical guiding element, it is proposed that the optical guide comprises a retardation plate and a polarisation beam splitter, said polarisation beam splitter being placed between the guiding element and the extracting device. In addition, it is proposed that the optical guide be such that each ray of the collimated light beam striking the polarisation beam splitter for the first time separates into two portions, a first portions being sent to the extracting device to define a first light imprint and a second portion being reflected by the polarisation beam splitter, said second portion continuing to be guided by the guiding element and, in so doing, passing twice through the retardation plate before hitting the polarisation beam splitter so as to define a second light imprint. The use of these two light imprints enables increasing the size of the eye box, meaning double the size of the eye box compared with the use of a single light imprint for a given injection zone size. By reversing the relationship, for a given eye box size, the use of these two light imprints enables halving the size of the injection zone and thus reduce the size of the injecting device for injecting collimated light in the optical guiding element.

In the following description, each optical guiding element is a plate with parallel faces for transporting the collimated light beam by total internal reflections. Guiding elements other than those detailed can be used in the context of the invention, in particular guiding elements comprising the injection zone on one of said faces and the extraction zone on the other of said faces, as well as guiding elements with faces curved like a vehicle windscreen.

FIG. 2 schematically illustrates a portion of a second optical guide, in one embodiment of the present invention, in a cross-sectional view in the direction of propagation of a light beam transported by the second optical guide.

The second optical guide comprises an optical guiding element 2.1, a light source (not shown) adapted for providing an image, an optical system (not shown) based on lenses for projecting this image in the form of a collimated light beam, and a prism or other injecting element (not shown) for injecting said light beam in the optical guiding element 2.1 via an injection zone.

The second optical guide further comprises an extracting device 2.14 defining a light-beam extraction zone where the light beam is extracted from the second optical guide in order to be supplied for example to the eye of a user. An eye box 2.15 is defined as allowing the user to see the image transported by the light beam and thereby extracted from the second optical guide. The extracting device 2.14 may be implemented in various ways, for example by using a hologram or a diffractive structure, or with a structure based on partially reflective parallel reflectors inserted in the heart of a substrate. In a preferred embodiment, the extracting device 2.14 comprises surface microstructures, as described in relation to FIG. 3.

The second optical guide further comprises a retardation plate 2.2 and a polarisation beam splitter PBS 2.3. The arrangement of the second optical guide is such that the retardation plate 2.2 and the polarisation beam splitter PBS 2.3 are sandwiched between the optical guiding element 2.1 and the extracting device 2.14. The retardation plate 2.2 is placed against an outer face of the optical guiding element 2.1, and the polarisation beam splitter PBS 2.3 is placed against the retardation plate and against the extracting device 2.14. The retardation plate 2.2 may be produced in the form of film to be laminated, or by deposition or otherwise, and the polarisation beam splitter PBS 2.3 may also be produced in the form of a laminate film or by vacuum deposition.

The retardation generated by the retardation plate 2.2 in the optical guiding element 2.1 is adapted so that any ray of said light beam which initially has a type-p polarisation has, passing through the retardation plate 2.2, a polarisation half s-type and half p-type. Let the phase shift generated by the retardation plate 2.2 depending on the angle of incidence a of the light beam be denoted $R(\alpha)$. A quarter-wave retardation plate typically has a phase shift value $R(\alpha)$ equal to $\pi/2$ and a half-wave retardation plate typically has a phase shift value $R(\alpha)$ equal to $\pi$.

To simplify the reasoning, let's consider a polarisation direction $\psi$ transmitted by the polarisation beam splitter PBS 2.3 equal to 0 degrees, so that the polarisation transmitted by the polarisation beam splitter PBS 2.3 is p-type and that reflected by the polarisation beam splitter PBS 2.3 is s-type. Let's further assume that the direction $\phi$ of the fast axis of the retardation plate 2.2 is different from 0 degrees.

Consider, by way of illustration, that any ray of the light beam injected initially has a p-type polarization (meaning in the plane defined by any injected ray, such as a ray 2.01 shown in FIG. 2, and the ray resulting from its total internal reflection in the optical guiding element 2.1, such as a resultant ray 2.0 shown in FIG. 2). When the ray 2.0 arrives at a point A representing the beginning of the extraction zone (in the direction of propagation of the light beam injected into the optical guiding element 2.1), the ray 2.0 passes through the retardation plate 2.2 and thus has a polarisation partially of p-type and partially of s-type when hitting the polarisation beam splitter PBS 2.3. The part of the ray 2.0 with the s-type polarisation is then reflected by the polarisation beam splitter PBS 2.3, passes back through the retardation plate 2.2 and therefore undergoes a change of polarisation, becoming partly s-type and partly p-type. This forms a ray 2.7, as shown in FIG. 2. The part having the p-type polarisation of the ray 2.0 passes through the polarisation beam splitter PBS 2.3 and strikes the extracting device 2.14 so as to be extracted from the optical guide. This forms a ray 2.4, as shown in FIG. 2.

The ray 2.7 is reflected at a point C on the face of the optical guiding element 2.1 which is opposite the face of the optical guiding element 2.1 where the extracting device 2.14 is mounted. At a zone B, the ray 2.7 passes through the retardation plate 2.2 and therefore has then partially s-type and partially p-type polarization. The part of the ray 2.7 with the p-type polarisation then passes through the polarisation beam splitter PBS 2.3 and strikes the extracting device 2.14 so as to be extracted from the optical guide. This forms a ray 2.9, as shown in FIG. 2.

A ray of the injected light beam striking the outer face of the optical guiding element 2.1 just before the point A undergoes total internal reflection and thus forms a ray 2.6, as shown in FIG. 2. When the ray 2.6 arrives in the zone B, the ray 2.6 passes through the retardation plate 2.2 and thus undergoes a change of polarisation, this polarisation being partially p-type and partially s-type at the time of hitting the polarisation beam splitter PBS 2.3. The part of the ray 2.6 with the s-type polarisation is then reflected by the polarisation beam splitter PBS 2.3, passes back through the retardation plate and therefore then has partially s-type and partially p-type polarization. This forms a ray 2.8, as shown in FIG. 2. The portion of the ray 2.6 having the p-type polarisation after passing through the retardation plate 2.2 passes through the polarisation beam splitter PBS 2.3 and strikes the extracting device 2.14 so as to be extracted from the optical guide. This forms a ray 2.5, as shown in FIG. 2.

The ray 2.8 is reflected at a point D on the face of the optical guiding element 2.1 which is opposite the face of the optical guiding element 2.1 where the extracting device 2.14 is mounted. At an zone E, the ray 2.8 passes through the retardation plate 2.2 and therefore has partially s-type and partly p-type polarization. The part of the ray 2.8 with the p-type polarisation therefore passes through the polarisation beam splitter PBS 2.3 and strikes the extracting device 2.14 so as to be extracted from the optical guide. This forms a ray 2.10, as shown in FIG. 2.

The arrangement of the second optical guide provides an eye box 2.15 consisting of two light imprints 2.11 and 2.13 respectively delimited in FIG. 2 by the rays 2.4 and 2.5 on one hand, and the rays 2.9 and 2.10 on the other hand. There may exist, between the two light imprints 2.11 and 2.13, a zone 2.12 that is not reached by the light beam extracted from the optical guide. In the light of the dimensions of the eye box 2.15 and the thickness of the retardation plate 2.2 and the polarisation beam splitter PBS 2.3, the presence of this zone is 2.12 has only a minimal and negligible impact on the uniformity of the energy distribution in the eye box 2.15.

The total internal reflections, in particular at points C and D, cause a phase shift which depends on the angle of incidence α of the collimated beam in the optical guiding element 2.1. Such a phase shift might cause an energy drop at the light imprint 2.13 by modifying the distribution of the p-type and s-type polarisations. To make uniform the distribution of energy between the two light imprints 2.11 and 2.13, it is desirable that the following equation be satisfied:

$$|e(2.4)|^2 = |e(2.9)|^2$$

where e(2.4) represents, vectorially, the state of polarisation of the ray 2.4 and e(2.9) represents, vectorially, the state of polarisation of the ray 2.9.

The state of polarisation e(2.4) of the ray 2.4 can be expressed as follows:

$$e(2.4) = P1 \cdot F1 \cdot e(2.0)$$

where: e(2.0) represents, vectorially, the state of polarisation of the ray 2.0; P1 is the transfer function of the passing polarisation axis of the polarisation beam splitter PBS 2.3; F1 represents the transfer function of the retardation plate 2.2 in a first traversing direction (from top to bottom on the representation of FIG. 2); and "o" represents a transfer function composition operator.

The state of polarisation e(2.9) of the ray 2.9 can be expressed as follows:

$$e(2.9) = P1 \cdot F1 \cdot (TIR \cdot F1') \cdot P2 \cdot F1 \cdot e(2.0)$$

where: P2 is the transfer function of the reflecting polarisation axis of the polarisation beam splitter PBS 2.3, F1' represents the transfer function of the retardation plate 2.2 in a second traversing direction (from bottom to top on the representation of FIG. 2) and TIR represents the transfer function of one total internal reflection.

Considering that the polarisation of the ray 2.0 is p-type and therefore that the state of polarisation e(2.0) of the ray 2.0 is expressed as follows:

$$e(2.0) = \begin{bmatrix} 1 \\ 0 \end{bmatrix}$$

it is then possible to make uniform the energy distribution between the two light imprints 2.11 and 2.13 by defining the orientation φ of the fast axis of the retardation plate 2.2 at 68 degrees, the orientation ψ of the polarisation transmitted by the polarisation beam splitter PBS 2.3 at 0 degrees and the phase difference R(α) generated by the retardation plate 2.2 at 180 degrees. Then:

$$|e(2.4)|^2 = |e(2.9)|^2 \approx 0.45$$

It may be noted that the system of equations to solve for parameterising the optical guide for uniform energy distribution between the two light imprints 2.11 and 2.13 is simple, so that the second optical guide is simple to produce.

FIG. 3 schematically illustrates an arrangement of an optical guide extracting device, which may be implemented in the context of the present invention.

The extracting device comprises a first portion 3.2 and a second portion 3.3. The first portion 3.1 is in the form of a plate, a flat face of which is placed against the polarisation beam splitter PBS 2.3 and the opposite face of which has a plurality of reflective microstructures formed on surface. These microstructures are composed of prisms having an angle enabling the light beam to emerge from the optical guide. The microstructures are preferably placed such that they are not separated by interstitial spaces, meaning the microstructures succeed each other. The microstructures are semi-reflective in order to obtain a see-through effect.

The second portion 3.2 has on the surface microstructures with a shape complementary to those of the first portion 3.1. An adhesive layer assembles the first 3.1 and second 3.2 portions so that any microstructure of the first portion 3.1 is separated from its complementary microstructure of the second portion 3.2 by a transparent medium of substantially constant thickness. This arrangement enables obtaining an equivalent of a plate with parallel faces with respect to see-through effect, which is thereby improved. Reference may be made to the international patent application published under the reference WO 2012/136470 A1 for what concerns forming such complementary microstructures.

A mechanical reinforcement of the optical guide may be added to the second optical guide, as described in relation to FIG. 6.

FIG. 4 schematically illustrates a portion of a third optical guide, in one embodiment of the present invention, in a cross-sectional view in the direction of propagation of a light beam transported by the third optical guide.

The third optical guide comprises a first optical guiding element 4.1, a second optical guiding element 4.2, a light source (not shown) adapted for providing an image, an optical system (not shown) with lenses for projecting this image as a collimated light beam, and a prism or other injecting element (not shown) for injecting said light beam in the second optical guiding element 4.2 via an injection zone.

The third optical guide further comprises the extracting device 2.14 already described in relation to FIG. 2. An eye box 4.13 is defined allowing the user to see the image injected into the third optical guide.

The third optical guide further comprises a retardation plate 4.3 and a polarisation beam splitter PBS 4.4. The arrangement of the third optical guide is such that the retardation plate 4.3 is sandwiched between the first guiding element 4.1 and the second optical guiding element 4.2. The total internal reflections of the light beam injected into the optical guide takes place between an outer face of the first optical element 4.1 and an outer face of the second optical guiding element 4.2. The polarisation beam splitter PBS 4.4 is therefore sandwiched between the first guiding element 4.1 and the extracting device 2.14. The polarisation beam splitter PBS 4.4 is placed against the external face of the first optical guiding element 4.1 and against the extracting device 2.14. The retardation plate may be produced in the form of a film to be laminated, or by deposition or otherwise, and the polarisation beam splitter PBS 4.4 may also be produced in the form of a film to be laminated or by vacuum deposition. An advantage of this arrangement is that laminating two films one on the other is avoided. In addition, the third optical guide is stiffened in the manner of a windscreen, so that, upon impact by a projectile, the first 4.1 and second 4.2 optical guiding elements are held one on the other. The risks of glass shards projected into the eye of the user are reduced.

Let us consider, by way of illustration, that any ray of the light beam injected initially has p-type polarization (the plane defined by any injected beam, such as a ray 4.51 shown in FIG. 4, and the ray resulting from its total internal reflection in the optical guiding elements, such as a resultant ray 4.5 shown in FIG. 4). After injection into the second optical guiding element 4.2, every ray of the injected light beam passes through the retardation plate 4.3 an odd number of times. When the ray 4.5 arrives at a point A' representing the beginning of the extraction zone (in the direction of propagation of the light beam injected into the second optical guiding element 4.2), the ray 4.5 has partially p-type and partially s-type polarization at the time of hitting the polarisation beam splitter PBS 4.4. The part of the ray 4.5 having the s-type polarisation is reflected by the polarisation beam splitter PBS 4.4, passes back through the retardation plate 4.3 and therefore has partially type-s and partly p-type polarization. This forms a ray 4.8, as shown in FIG. 4. The part with the p-type polarisation of the ray 4.5 arriving at point A' passes through the polarisation beam splitter PBS 4.4 and strikes the extracting device 2.14 so as to be extracted from the optical guide. This forms a ray 4.9, as shown in FIG. 4.

The ray 4.8 passes through the retardation plate and is reflected at a point C', on the outer face of the second guiding element 4.2. The ray 4.8 after reflection passes back through the retardation plate 4.3. The part 4.8 of the ray 4.8, after passing back through the retardation plate 4.3 again, having a p-type polarisation, therefore passes through the polarisation beam splitter PBS 4.4 and strikes the extracting device 2.14 so as to be extracted from the optical guide. This forms a ray 4.11, as shown in FIG. 4.

A ray of the injected light beam striking the outer face of the first optical guiding element 4.1 just before the point A' undergoes total internal reflection and thus forms a ray 4.6, as shown in FIG. 4. The ray 4.6 passes through the retardation plate 4.3, is then reflected at a point C on the outer face of the second optical guiding element 4.2 and again passes through the retardation plate 4.3. When the ray 4.6 enters a zone B', the ray 4.6 has a partially p-type polarisation and partially type s. The part of the ray striking the polarisation beam splitter PBS 4.4 having the s-type polarisation is reflected by the polarisation beam splitter PBS 4.4, and again passes through the retardation plate 4.3. This forms a ray 4.7, as shown in FIG. 4. The part of the ray 4.6 with the p-type polarisation passes through the polarisation beam splitter PBS 4.4 and strikes the extracting device 2.14 so as to be extracted from the optical guide. This forms a ray 4.10, as shown in FIG. 4.

After passing through the retardation plate 4.3, the ray 4.7 is reflected at a point D' on the outer face of the second optical guiding element 4.2. After reflection, the ray 4.7 passes through the retardation plate 4.4 again. On arrival in an zone E', the part of the ray 4.7 with the p-type polarisation therefore passes through the polarisation beam splitter PBS 4.4 and strikes the extracting device 2.14 so as to be extracted from the optical guide. This forms a ray 4.12, as shown in FIG. 4.

The arrangement of the third optical guide provides an eye box 4.13 consisting of two light imprints 4.14 and 4.15 respectively delimited in FIG. 4 by the rays 4.9 and 4.10 on one hand, and the rays 4.11 and 4.12 on the other hand. As for the second optical guide of FIG. 2, there may exist between the two light imprints 4.14 and 4.15 a zone 4.16 that is not reached by the light beam extracted from the optical guide.

The total internal reflections, particularly at points C and D, result in a phase shift which depends on the angle of incidence of the collimated beam in the second optical guiding element 4.2. Such a phase shift might cause in particular an energy drop at the light imprint 4.15 by modifying the distribution of the p-type and s-type polarisations. To make uniform the distribution of energy between the two light imprints 4.14 and 4.15, it is desirable that the following equation be satisfied:

$$|e(4.9)|^2 = |e(4.10)|^2 = |e(4.11)|^2 = |e(4.12)|^2$$

where: e(4.9) represents vectorially, the state of polarisation of the ray 4.9; e(4.10) represents, vectorially, the state of polarisation of the ray 4.10; e(4.11) represents, vectorially, the state of polarisation of the ray 4.11; and e(4.12) represents, vectorially, the state of polarisation of the ray 4.12.

The state of polarisation e(4.9) of the ray 4.9 can be expressed as follows:

$$e(4.9) = P3 \cdot F2 \cdot (TIR \cdot F2' \cdot TIR \cdot F2)^n \cdot e(4.5)$$

where: e(4.5) represents, vectorially, the state of polarisation of the beam 4.5 as injected into the second optical guiding element 4.2; 2n+1 defines the number of times the ray 4.5 passes through the retardation plate 4.3 before reaching the point A'; P3 represents the transfer function of the passing polarisation axis of the polarisation beam splitter PBS 4.4; F2 represents the transfer function of the retardation plate 4.3 in a first traversing direction (from top to bottom in the representation of FIG. 4) and F2' is the transfer function of the retardation plate 4.3 in a second traversing direction (from bottom to top in the representation of FIG. 4).

The state of polarisation e(4.10) of the ray 4.10 can be expressed as follows:

$$e(4.10) = P3 \cdot F2 \cdot (TIR \cdot F2' \cdot TIR \cdot F2)^{n+1} \cdot e(4.5)$$

The state of polarisation e(4.11) of the ray 4.11 can be expressed as follows:

$$e(4.11) = P3 \cdot (F2 \cdot TIR \cdot F2') \cdot P4 \cdot F2 \cdot (TIR \cdot F2' \cdot TIR \cdot F2)^n \cdot e(4.5)$$

where: P4 represents the transfer function of the reflecting polarisation axis of the polarisation beam splitter PBS 4.4.

The state of polarisation e(4.12) of the ray 4.12 can be expressed as follows:

$$e(4.11) = P3 \cdot (F2 \cdot TIR \cdot F2') \cdot P4 \cdot F2 \cdot (TIR \cdot F2' \cdot TIR \cdot F2)^{n+1} \cdot e(4.5)$$

Assuming that the ray 2.0 has the p-type polarization and therefore that the state of polarisation e(4.5) of the ray 4.5 is expressed as follows:

$$e(4.5) = \begin{bmatrix} 1 \\ 0 \end{bmatrix}$$

it is possible to make uniform the energy distribution between the two light imprints 4.14 and 4.15 by defining, for n=1, the orientation $\phi$ of the fast axis of the retardation plate 4.3 at 68 degrees, the orientation $\psi$ of the polarisation transmitted by the polarisation beam splitter PBS 4.4 at 0 degrees and the phase difference $R(\alpha)$ generated by the retardation plate 4.3 at 180 degrees. Then:

$$|e(4.9)|^2 = |e(4.10)|^2 = |e(4.11)|^2 = |e(4.12)|^2 \approx 0.45$$

FIG. 5 schematically illustrates a portion of a fourth optical guide, in an embodiment of the present invention, in a cross-sectional view in the direction of propagation of a light beam transported by the fourth optical guide.

The fourth optical guide comprises the optical guiding element 2.1 already described in relation to FIG. 2, a light source (not shown) adapted for providing an image, an optical system (not shown) based on lenses to project this image as a collimated light beam, and a prism or other injecting element (not shown) for injecting said light beam in the optical guiding element 2.1 via an injection zone.

The fourth optical guide further comprises the extracting device 2.14 already described in relation to FIG. 2. An eye box 5.10 is defined allowing the user to see the image injected in the fourth optical guide.

The fourth optical guide further comprises a retardation plate 5.1 and a polarisation beam splitter PBS 5.2. The arrangement of the fourth optical guide is such that the retardation plate 5.1 is placed on the outer face of the guiding element 2.1 which is opposite the outer face on which the extracting device 2.14 is mounted. The total internal reflections of the light beam injected into the optical guide take place between an outer face of the optical guiding element and an outer face 2.1 of the retardation plate 5.1. The polarisation beam splitter PBS is sandwiched between the guiding element 2.1 and the extracting device 2.14. The polarisation beam splitter PBS 5.2 is therefore placed against the outer face of the guiding element 2.1 and against the extracting device 2.14. The retardation plate 5.1 may be used in the form of a film to be laminated, or by deposition or otherwise, and the polarisation beam splitter PBS 5.2 can also be implemented in the form of a film to be laminated or by vacuum deposition. An advantage of this arrangement is that laminating two films one on the other is avoided.

Let us consider, by way of illustration, that any ray of the light beam injected initially has the p-type polarisation (the plane defined by any injected beam, such as a ray 5.01 shown in FIG. 5, and the ray resulting from its total internal reflection in the optical guiding element 2.1, such as a resultant ray 5.0 shown in FIG. 5). After injection into the guiding element 2.1, any ray of the injected beam passes through the retardation plate 5.1 an odd number of times. When the ray 5.0 arrives at a point A'' representing the beginning of the extraction zone (in the direction of propagation of the light beam injected into the optical guiding element 2.1), the ray 5.0 has partially p-type and partially s-type polarization at the time of hitting the polarisation beam splitter PBS 5.2. The part of the ray 5.0 having the s-type polarisation is reflected by the polarisation beam splitter PBS 5.2. This forms a ray 5.5, as shown in FIG. 5. The ray 5.5 passes through the retardation plate 5.1, is reflected on the outer face of the retardation plate 5.1 and therefore, returning to the inside of the guiding element 2.1, has partially s-type and partially p-type polarization.

The part of the ray 5.0 having the p-type polarisation arriving at point A'' passes through the polarisation beam splitter PBS 5.2 and strikes the extracting device 2.14 so as to be extracted from the optical guide. This forms a ray 5.6, as shown in FIG. 5.

When the ray 5.5 returns to the polarisation beam splitter PBS 5.2 in a zone B'', the part of the ray 5.5 with the p-type polarisation therefore passes through the polarisation beam splitter PBS 5.2 and strikes the extracting device 2.14 so as to be extracted from the optical guide. This forms a ray 5.8, as shown in FIG. 5.

A ray of the injected light beam striking the external face of the optical guiding element 2.1 just before the point A'' undergoes total internal reflection and thus forms a ray 5.3, as shown in FIG. 5. The ray 5.3 passes through the retardation plate 5.1, undergoes total internal reflection at a point C'' on the outer face of the retardation plate 5.1 and passes back through the retardation plate 5.1. When the ray 5.3 then arrives in a zone B'', the ray 5.3 has partially p-type and partially s-type polarization. The part of the ray 5.3 striking the polarisation beam splitter PBS 5.2 having the s-type polarisation is reflected by the polarisation beam splitter PBS 5.2. This forms a ray 5.4, as shown in FIG. 5. The part of the ray 5.3 with the p-type polarisation passes through the polarisation beam splitter PBS 5.3 and strikes the extracting device 2.14 so as to be extracted from the optical guide. This forms a ray 5.7, as shown in FIG. 5.

The ray 5.4 passes through the retardation plate 5.1 and comes to be reflected at a point D" on the outer face of the retardation plate 5.1 and passes back through the retardation plate 5.1. Once arrived in a zone E", the portion of the ray 5.4 having the p-type polarisation therefore passes through the polarisation beam splitter PBS 5.2 and strikes the extracting device 2.14 so as to be extracted from the optical guide. This forms a ray 5.9, as shown in FIG. 5.

The arrangement of the fourth optical guide enables obtaining an eye box 5.10 consisting of two light imprints 5.11 and 5.12 respectively delimited in FIG. 5 by the rays 5.6 and 5.7 on one hand, and the rays 5.8 and 5.9 on the other hand. As with the second optical guide of FIG. 2, there may exist, between the two light imprints 5.11 and 5.12, a zone 5.13 that is not reached by the light beam ejected from the optical guide.

The total internal reflections, particularly at points C" and D", cause a phase shift which depends on the angle of incidence of the collimated beam in the guiding element 2.1. Such a phase shift might cause in particular an energy drop at the light imprint 5.12 by modifying the distribution of s-type and p-type polarisations. To make uniform the distribution of energy between the two light imprints 5.11 and 5.12, it is desirable for the following equation to be satisfied:

$$|e(5.6)|^2=|e(5.7)|^2=|e(5.8)|^2=|e(5.9)|^2$$

where: $e(5.6)$ represents vectorially the state of polarisation of the ray 5.6; $e(5.7)$ represents, vectorially, the state of polarisation of the ray 5.7; $e(5.8)$ represents, vectorially, the state of polarisation of the ray 5.8; and $e(5.9)$ represents, vectorially, the state of polarisation of the ray 5.9.

The state of polarisation $e(5.6)$ of the ray 5.6 can be expressed as follows:

$$e(5.6)=P5 \cdot F3 \cdot (TIR \cdot F3' \cdot TIR \cdot F3)^n \cdot e(5.9)$$

where: $e(5.6)$ represents, vectorially, the state of polarisation of the ray 5.0 as injected into the optical guiding element 2.1; $2n+1$ defines the number of times the ray 5.0 passes through the retardation plate 5.2 before reaching the point A"; P5 represents the transfer function of the passing polarisation axis of the polarisation beam splitter PBS 5.3; F3 represents the transfer function of the retardation plate 5.2 in a first traversing direction (from bottom to top in the illustration of FIG. 5), and F3 represents the transfer function of the retardation plate 5.2 in a second traversing direction (from top to bottom in the illustration of FIG. 5).

The state of polarisation $e(5.7)$ of the ray 5.7 can be expressed as follows:

$$e(5.7)=P5 \cdot F3 \cdot (TIR \cdot F3' \cdot TIR \cdot F3)^{n+1} \cdot e(5.0)$$

The state of polarisation $e(5.8)$ of the ray 5.8 can be expressed as follows:

$$e(5.6)=P5 \cdot (F3 \cdot TIR \cdot F3') \cdot P6 \cdot F3 \cdot (TIR \cdot F3' \cdot TIR \cdot F3)^n \cdot e(5.0)$$

wherein P6 is the transfer function of the reflective polarising axis of the polarisation beam splitter PBS 5.3.

The state of polarisation $e(5.9)$ of the ray 5.9 can be expressed as follows:

$$e(5.9)=P5 \cdot (F3 \cdot TIR \cdot F3') \cdot P6 \cdot F3 \cdot (TIR \cdot F3' \cdot TIR \cdot F3)^{n+1} \cdot e(5.0)$$

Assuming that the ray 5.0 has the p-type polarization and therefore that the state of polarisation $e(5.0)$ of the ray as injected into the optical guiding element 2.1 is expressed as follows:

$$e(5.0) = \begin{bmatrix} 1 \\ 0 \end{bmatrix}$$

it is then possible to make uniform the distribution of energy between the two light imprints 5.11 and 5.12 by defining, for n=1, the orientation φ of the fast axis of the retardation plate 5.2 at 68 degrees, the orientation ψ of the polarisation transmitted by the polarisation beam splitter PBS 5.3 at 0 degrees and the phase difference R(α) generated by the retardation plate 5.2 at 180 degrees. Then:

$$|e(5.6)|^2=|e(5.7)|^2=|e(5.8)|^2=|e(5.9)|^2 \approx 0.45$$

FIG. 6 schematically illustrates an arrangement of mechanical reinforcement of the optical guide, which may be implemented in the context of the present invention, particularly when the extracting device used is that shown in FIG. 3.

To mechanically reinforce the optical guide, it is proposed to compensate the difference between the thickness of the optical guide in an zone where the collimated light beam is propagated by total internal reflections and the thickness of the optical guide at the extraction zone. In the context of FIG. 6, the thickness compensation is performed with respect to the assembly formed by the portions 3.2 and 3.3 forming the extracting device already described in connection with FIG. 3. This compensation of difference in thickness can be achieved thanks to a transparent plate bonded to the outer face of the optical guiding element 2.1 on which the extracting device 3.1 is mounted. The adhesive used must be of low enough index compared with the index of the material from which the optical guiding element 2.1 is manufactured so as to ensure that total internal reflections take place against the outer face of the optical guiding element 2.1. For example, an adhesive having an index value 1.33 for an optical guiding element having an index value 1.6 can be used to guide the rays to an angle α of 56.2 degrees.

The proposed arrangement for mechanically reinforcing the optical guide is such that said mechanical reinforcement does not affect the total internal reflections described above.

The explanations of the functioning of the optical guide have been detailed on the assumption that the light beam injected into the optical guide has the p-type polarisation. The same principles apply if the light beam injected into the optical guide has the s-type polarisation or circular polarisation. The control of this polarisation of the light beam injected into the optical guide may be natural, when coming from an LCoS imager or LCD imager, or forced, by the use of retardation plates and/or polarisers between the injection system and the optical guiding element concerned. The same principles also apply if the light beam injected into the optical guide is depolarised, which is the case with an OLED imager. The impact is in fact only on the state of polarisation of the injected light beam, the rest of the system of equations to be solved being unchanged.

Moreover, the explanations of the functioning of the optical guide have been detailed on the assumption that the polarisation beam splitter PBS is in the form of a film to be laminated having a first eigenaxis completely transmissive for a P1 polarisation (p-polarisation in the embodiments detailed above) and totally reflective for a polarisation orthogonal to the polarisation P1 and a second eigenaxis, orthogonal to the first eigenaxis, totally reflective for the polarisation P1 and totally transmissive for a polarisation orthogonal to the polarisation P1. It is possible to produce the polarisation beam splitter PBS by interferential treatment in the form of vacuum deposition of a plurality of layers of different materials with different indices. This enables being independent from the orientation ψ of the polarisation transmitted by the polarisation beam splitter PBS. It is then possible to form the polarisation beam splitter PBS so that the transmissivity for the p-polarisation is total, for the reflectivity for the p-polarisation to be null, for the transmissivity for the s-polarisation to be partial and for the reflectivity for the s-polarisation also to be partial, or vice-versa, meaning for the transmissivity for the s-polarisation to be total, for the reflectivity for the s-polarisation to be null, for the transmissivity for the p-polarisation to be partial and for the reflectivity for the p-polarisation also to be partial. This increases the efficiency of the see-through effect.

The invention claimed is:

1. An optical guide comprising at least one guiding element adapted for enabling, by total internal reflections, transporting an image in the form of a collimated light beam from an injection zone to an extraction zone where an image extracting device is mounted, the optical guide comprising a retardation plate and a polarisation beam splitter, the polarisation beam splitter being placed between the guiding element and the extracting device, the optical guide being such that each ray of said collimated light beam striking the first polarisation beam splitter separates into two portions, a first portion being sent to the extracting device so as to define a first light imprint and a second portion being reflected by the polarisation beam splitter, said second portion continuing to be guided by the guiding element and thereby passing twice through the retardation plate before hitting the polarisation beam splitter so as to define a second light imprint, wherein the optical guide comprises two guiding elements the retardation plate is sandwiched between the two guiding elements, and the polarisation beam splitter is sandwiched between an outer face of the assembly formed by said guiding elements and the extracting device.

2. The optical guide according to claim 1, wherein the extracting device consists of a plate, the outer face of which comprises a set of reflective microstructures formed on surface, said microstructures consisting of prisms having an angle enabling the collimated light beam to emerge from the optical guide.

3. The optical guide according to claim 1, wherein the extracting device consists of a first portion comprising a set of semi-reflective microstructures formed on surface, said microstructures consisting of prisms having an angle enabling the collimated light beam to emerge from the optical guide, and a second portion having on surface microstructures with a shape complementary to those of the first portion, an adhesive layer joining the first and second portions so that any microstructure of the first portion is separated from its complementary microstructure of the second portion by a transparent medium of substantially constant thickness.

4. Optical guide according to claim 1, wherein the optical guide comprises a mechanical reinforcement by compensating a difference between the thickness of the optical guide in a zone where the collimated light beam is propagated by total internal reflections and the thickness of the optical guide at the extraction zone, so that said mechanical reinforcement does not change said total internal reflections.

5. Optical guide according to claim 1, wherein the polarisation beam splitter is implemented by interferential treatment in the form of vacuum deposition of a plurality of layers of different materials with different indices, so that the transmissivity for the p-polarisation is total, the reflectivity for the p-polarisation is null, the transmissivity for the s-polarisation is partial and the reflectivity for the s-polarisation is also partial, or vice-versa.

* * * * *